United States Patent [19]
Beazley

[11] 3,955,589
[45] May 11, 1976

[54] FLUID ISOLATING VALVE

[76] Inventor: Rodney Thomas Beazley, 19 Lancet Lane, Loose, Downderry, Maidstone, Kent, England

[22] Filed: June 3, 1974

[21] Appl. No.: 476,075

[52] U.S. Cl. ............................................... 137/75
[51] Int. Cl.² ....................................... F16K 17/38
[58] Field of Search ............................ 137/72–77; 122/504.1, 504.3; 220/89 B; 169/19, 42, 57, 26, 37; 98/86; 126/287.5; 337/403, 407, 408, 409, 414

[56] References Cited
UNITED STATES PATENTS

| | | | |
|---|---|---|---|
| 705,572 | 7/1902 | Field | 137/75 |
| 973,260 | 10/1910 | Creighton | 137/75 |
| 1,082,708 | 12/1913 | Schmachtenberger | 137/77 |
| 1,886,454 | 11/1932 | Sutherland | 137/75 |
| 3,151,688 | 10/1964 | Young | 137/75 X |

*Primary Examiner*—Martin P. Schwadron
*Assistant Examiner*—Richard Gerard
*Attorney, Agent, or Firm*—Pierce, Scheffler & Parker

[57] ABSTRACT

This invention is a valve for isolating a fluid such as petroleum, oil or gas, in a fluid system, in the event of fire breaking out. A fusible cap containing a valve element collapses at a lower temperature than the material in the rest of the system, allowing the valve element to seal the system under pressure of a spring.

1 Claim, 3 Drawing Figures

FLUID ISOLATING VALVE

The present invention relates to fluid isolating valves and particularly to fluid isolating valves of the check valve type.

Heretofore, in the case of fire-emergency, fluid in pipes was isolated from the fire by means of a thermostatically responsive valve or by means of a fusible plug, that is to say, by means of a plug made from a material which deformed and collapsed readily at a relatively low temperature to seal off the pipe and thus obviate exposure of the fluid therein to the fire.

According to the present invention there is provided a fluid isolating valve comprising a cap in which the main valve element including a closure member is mounted and restrained, the cap being made wholly from a material known to deform and collapse at a lower temperature than the material of the valve casing on which the cap is mounted, the cap forming part of the external casing of the valve.

In a preferred embodiment of the invention the cap is made of fusible metal or plastics while the valve casing is normally made of cast iron, such that the cap may be adapted to collapse at, say, 300°C while the cast iron casing will stand up to a temperature several hundred degrees higher.

An embodiment of the invention will now be described, by way of example only, with reference to the accompanying drawings in which:

FIG. 2 is a section through the valve; while

Figure 1:
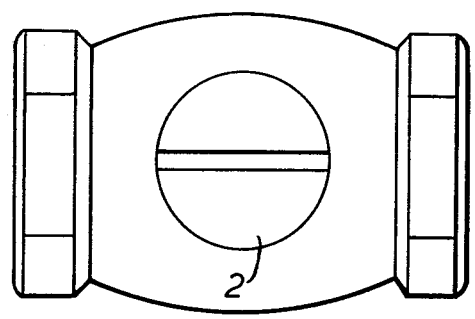
FIG. 1 is a plan of the bottom of the fire emergency isolating check valve showing the fusible cap.

Referring to the drawings, an isolating check valve comprises a casing or general body portion 1 manufactured from cast iron or other metal suitable to withstand a temperature in the region of over 800°C. A cover nut 5 made of the same or similar material to that of the casing is screw-threaded mounted on the top of the valve. Peripherally supported by the body portion is a fusible metal cap 2 in which the main valve stem 3 is mounted and restrained.

A main valve spring 4 disposed between the cover nut 5 and the valve element maintains a constant downward force on the valve element and stem and consequently on the fusible cap in which the valve stem is centrally disposed.

A known sealing assembly comprising a stuffing box 6 and a seal 7 are disposed around the stem of the valve element in the region of the cap.

The valve element disposed at the top of the valve stem is adapted to seat a valve element on the seat 8 and thus close a fluid passage 9.

Figure 2:
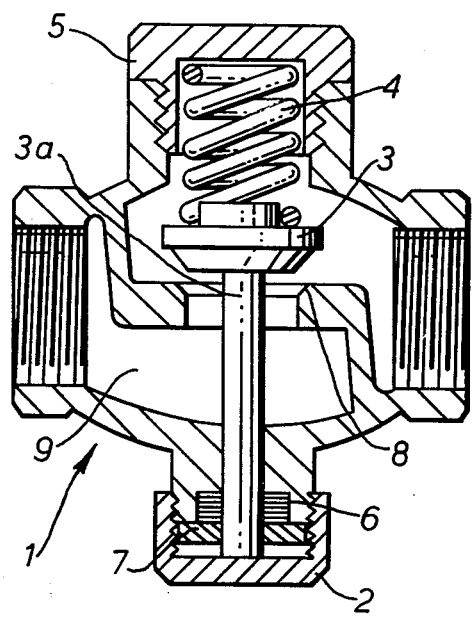
Figure 3:
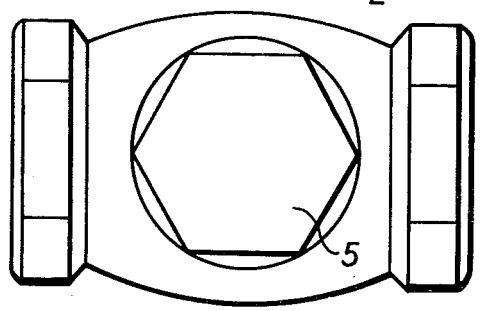
FIG. 3 is a plan view of the valve showing the disposition of the valve cover cap.

The valve element may be arranged to operate under gravity or in response to a specific pressure provided by a compression valve spring 4 as shown in FIG. 2.

In operation, in the event of fire encompassing the valve, the fusible cap 2 will collapse when the temperature reaches a degree, say, 300°C, permitting the main valve element 3 and stem 3a to descend under the force of the main valve spring 4 to seat the valve seat 8 and thus close the fluid passage 9.

What I claim as my invention and desire to secure by Letters Patent is:

1. In a heat responsive emergency fluid isolating valve structure of the type comprising a valve casing provided with an inlet and outlet communicable through a valve opening including a valve seat within which is located a valve stem carrying a valve member at one end thereof cooperative with said seat and a compression spring cooperating with said valve seat and valve member for urging the latter to a closed position on said seat, the improvement wherein an internally threaded cap member made wholly from a material which fuses at the desired valve actuating temperature is screwed directly onto an externally threaded projecting part of said valve casing provided with a bore through which said valve stem is guided, said cap member engaging the opposite end of said valve stem which is entered into said cap member to hold the valve stem and valve member in the valve-open position against the counter action of said compression spring until the cap fuses and falls away.

* * * * *